(12) United States Patent
Chang et al.

(10) Patent No.: US 7,987,557 B2
(45) Date of Patent: Aug. 2, 2011

(54) ENCLOSED HINGE DEVICE WITH A READILY CENTER-ALIGNED MECHANISM

(75) Inventors: Jui Hung Chang, Sinjhuang (TW); Chun-Hung Hu, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 131 days.

(21) Appl. No.: 12/234,674

(22) Filed: Sep. 21, 2008

(65) Prior Publication Data
US 2009/0113670 A1 May 7, 2009

(30) Foreign Application Priority Data

Nov. 2, 2007 (TW) .............................. 96141943 A

(51) Int. Cl.
*E05C 17/64* (2006.01)
(52) U.S. Cl. ............................................. 16/342; 16/330
(58) Field of Classification Search .................... 16/342, 16/340, 344, 337
See application file for complete search history.

(56) References Cited

U.S. PATENT DOCUMENTS

| | | | | |
|---|---|---|---|---|
| 5,269,047 A * | 12/1993 | Lu | | 16/340 |
| 6,584,646 B2 * | 7/2003 | Fujita | | 16/342 |
| 7,513,012 B2 * | 4/2009 | Chao | | 16/342 |
| 7,578,032 B2 * | 8/2009 | Chen | | 16/374 |
| 7,581,290 B2 * | 9/2009 | Chang | | 16/340 |
| 7,603,747 B2 * | 10/2009 | Ho et al. | | 16/330 |
| 2004/0025298 A1 * | 2/2004 | Yang et al. | | 16/340 |
| 2005/0039301 A1 * | 2/2005 | Lu et al. | | 16/321 |
| 2006/0185126 A1 * | 8/2006 | Su | | 16/340 |
| 2006/0213030 A1 * | 9/2006 | Lu et al. | | 16/221 |
| 2007/0169314 A1 * | 7/2007 | Lee et al. | | 16/342 |
| 2008/0172836 A1 * | 7/2008 | Lee et al. | | 16/342 |
| 2008/0184530 A1 * | 8/2008 | Chao | | 16/342 |
| 2008/0256750 A1 * | 10/2008 | Chung | | 16/342 |
| 2009/0271948 A1 * | 11/2009 | Wang | | 16/340 |

* cited by examiner

*Primary Examiner* — Victor Batson
*Assistant Examiner* — Matthew Sullivan
(74) *Attorney, Agent, or Firm* — Guice Patents PLLC

(57) ABSTRACT

The present invention discloses an enclosed hinge device with a readily center-aligned mechanism, employing two protruded blocks of a locking retainer engaged into and fastened with two notch grooves of an arresting part to form two positioning points, such that the locking retainer and the arresting part are not slidable therebetween along with the advantage of easy assembly. Further, the securingly connection between the enclosing part, the arresting part, and the locking retainer also enhances the structural strength, thereby reducing the rotational shaking of the pivotal axle.

18 Claims, 9 Drawing Sheets

US 7,987,557 B2

ENCLOSED HINGE DEVICE WITH A READILY CENTER-ALIGNED MECHANISM

FIELD OF THE INVENTION

The present invention relates to an enclosed hinge structure with a readily center-aligned mechanism and in particular to a readily center-aligned mechanism suitable for an enclosed hinge structure.

BACKGROUND OF THE INVENTION

"Rotating Shaft Structure with Automatic Locking Mechanism," developed by the present inventor, is disclosed in the ROC Patent No. M296586 on Aug. 21, 2006 (corresponding to the PRC Patent No. 200620001995.4), as shown in FIG. 10. The invention mainly involves inserting the shaft 101 of an axial member 10 into, in the order of, a friction disc 30, a plate connecting part 40, a cam member 50, an elastic body 60, and securingly fixed onto the main frame 20, wherein the cam member 50 comprises a fastening part 501 and a sliding part 502, and when the axial member 10 rotates, the wedge slot 502a of the sliding part 502 is driven to slide and engage into the wedge block 501a of the fastening part 501, achieving the auto-locking function.

However, the centers of the respective axle hole of the main frame 20, the friction disc 30, the plate connecting part 40, and the cam member 50 have to be aligned before they can be inserted into the axial member 10. If any axle hole is not accurately aligned with the others, the axial member 10 cannot be inserted thereinto. It is therefore a drawback which required to be overcome.

SUMMARY OF THE INVENTION

The main object and the improvement of the present invention is to provide an enclosed hinge device with a readily center-aligned mechanism, employing two protruded blocks of a locking retainer engaged into and fastened with two notch grooves of an arresting part to form two positioning points, such that the locking retainer and the arresting part are not slidable therebetween along with the advantage of easy assembly.

One improvement of the present invention is that the pivotal axle can be easily inserted into the arresting part and the locking retainer so as to reduce the need of aligning the axle holes, and the securingly connection between the enclosing part, the arresting part, and the locking retainer also enhances the structural strength, thereby reducing the rotational shaking of the pivotal axle.

A preferred embodiment of the present invention is an enclosed hinge device with a readily center-aligned mechanism, comprising:

an enclosing part having an enclosing end; an arresting part securingly fixed onto one side of the enclosing part and having a pair of notch grooves; a locking retainer having a pair of protruded blocks, which may be engaged into and fastened with the two notch grooves; a pivotal axle having a first axle segment pivoted onto the enclosing end, and a second axle segment pivoted onto the arresting part and inserted through the locking retainer; wherein the end of the second axle segment may be inserted, in the order of, a locking rotator, and elastic parts, and is then securingly retained with a nut with the locking rotator being rotatable with the second axle segment.

BRIEF DESCRIPTION OF THE DRAWINGS

The present invention can be more fully understood by reference to the following description and accompanying drawings, in which.

DETAILED DESCRIPTION OF THE INVENTION

Figure 1:
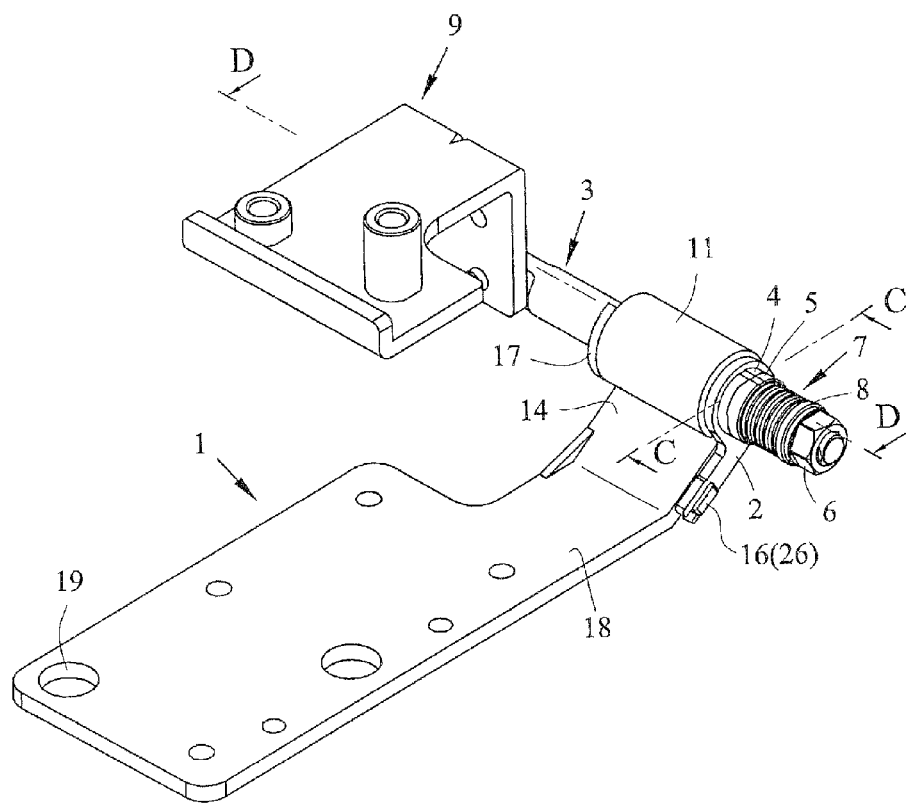
FIG. 1 is a perspective view of a preferred embodiment of the present invention.
Figure 2:
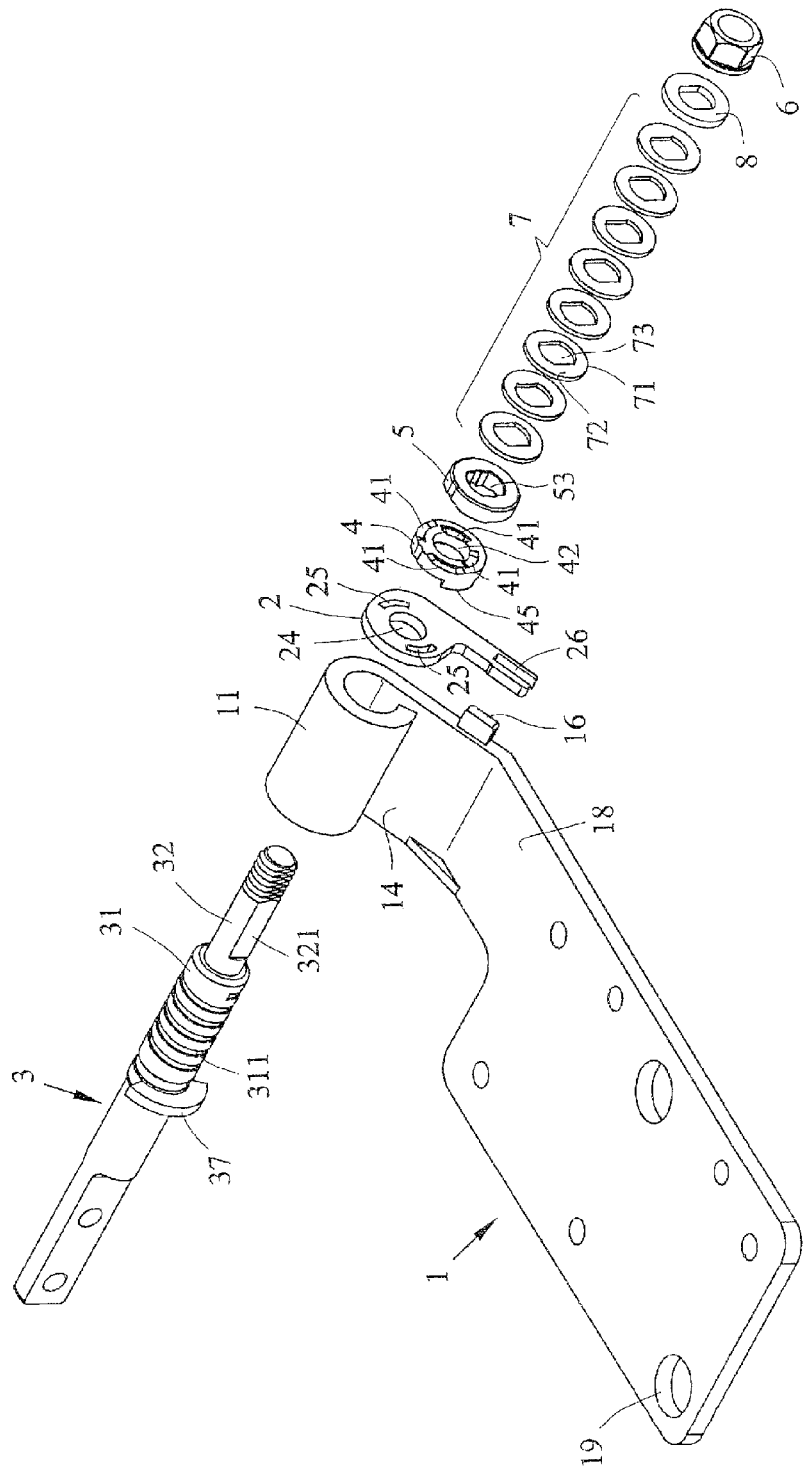
FIG. 2 is an exploded perspective view of a preferred embodiment of the present invention.
Figure 3:
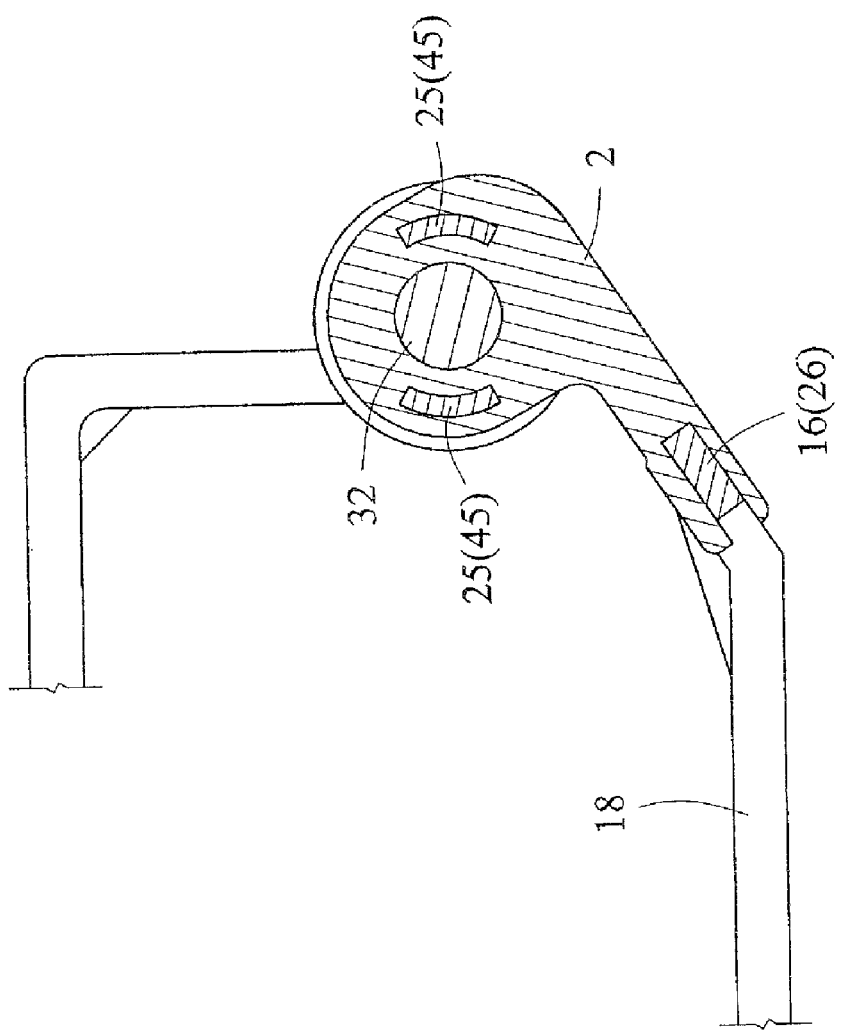
FIG. 3 is the cross-sectional view taken through the C-C line in FIG. 1.
Figure 4:
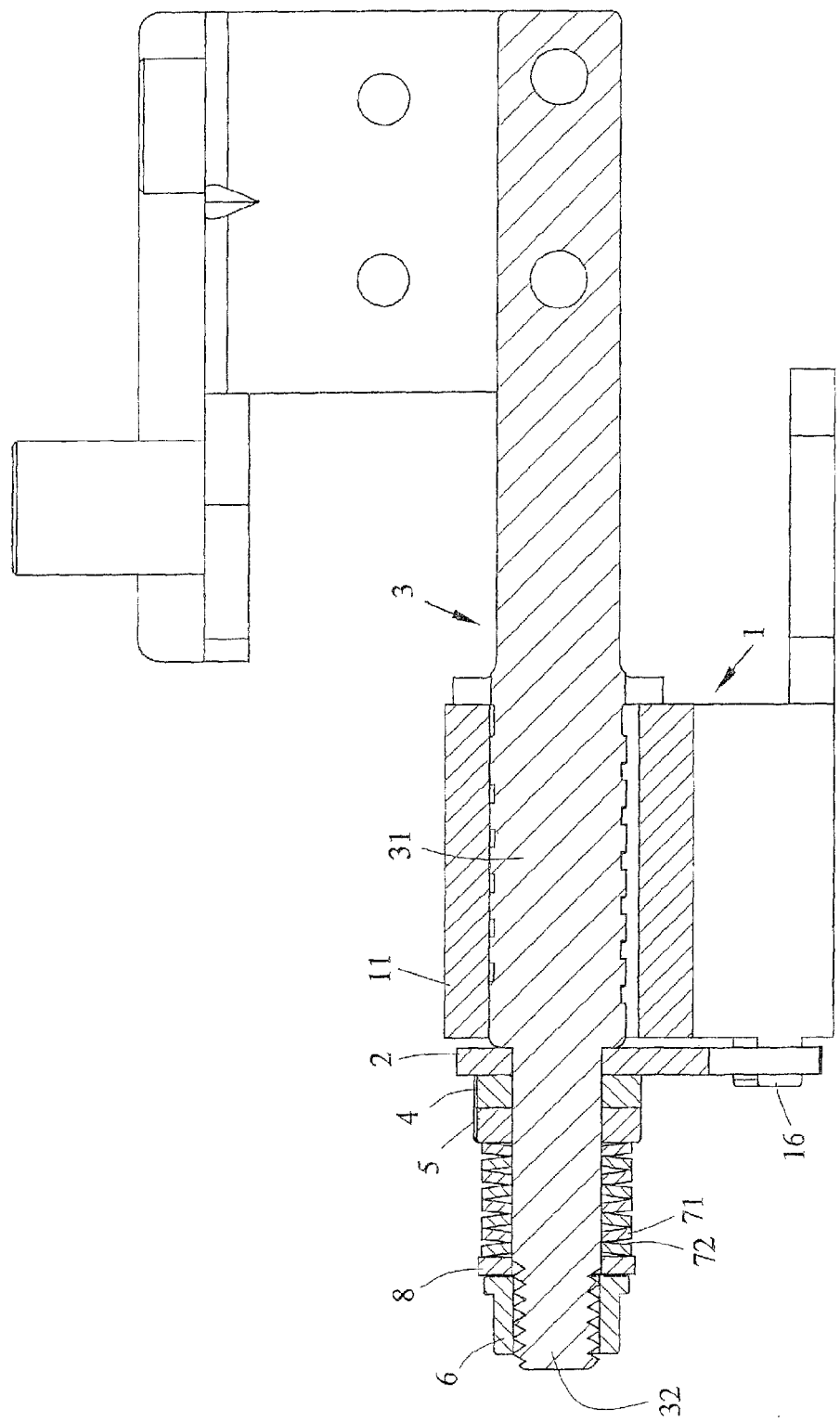
FIG. 4 is the cross-sectional view taken through the D-D line in FIG. 1.

With reference to FIGS. 1 to 4, a preferred embodiment of the hinge device according to the present invention comprises:

an enclosing part 1 having an enclosing end 11;

an arresting part 2 securingly fixed onto one side of the enclosing part 1 (for example, the enclosing part 1 is on its one side disposed with a fastening block 16 and a fastening notch groove 26 is disposed on the arresting part 2, wherein the fastening block 16 may be embeddingly fixed onto the fastening notch groove 26 to join together the enclosing part 1 and the arresting part 2) and having a pair of notch grooves 25; and a locking retainer 4 having a pair of protruded blocks 45, which may be engaged into and fastened with the two notch grooves 25 (forming two anchor points), respectively, such that the through hole 42 of the locking retainer 4 may be aligned with the pivotal hole 24 of the arresting part 2 and, after their joining together, the locking retainer 4 and the arresting part 2 are not slidable therebetween, i.e., the accuracy of the alignment of the through hole 42 and the pivotal hole 24 needs not to be recalibrated;

a pivotal axle 3 having a first axle segment 31 pivoted onto the enclosing end 11, and a second axle segment 32 pivoted onto the pivotal hole 24 of the arresting part 2 and inserted through the through hole 42 of the locking retainer 4; wherein the end of the second axle segment 32 is inserted, in the order of, a locking rotator 5, and elastic parts 7, and is then securingly retained with a nut 6 with the locking rotator 5 being rotatable with the second axle segment 32.

Consequently, the pivotal axle 3 may be easily inserted into the arresting part 2 and the locking retainer 4 without the need of aligning their axle holes. Also, the securingly connection between the enclosing part 1, the arresting part 2, and the locking retainer 4 can enhance the structural strength, thereby reducing the rotational shaking of the pivotal axle 3.

Further, the locking retainer 4 has a positioning slot 41 and the locking rotator 5 has a positioning block 51. When the locking rotator 5 is in the locking position, the positioning block 51 is positioned at the positioning slot 41. The elastic part 7 is a plurality of spring discs of springs (not shown), and the plurality of the spring discs 71 are formed to have arc faces 72 and alternately inserted onto the end of the second axle segment 32. The second axle segment 32 of the pivotal axle 3 is formed to have at least a flat face 321, and the locking rotator 5 and the plurality of the spring discs 71 are correspondingly formed to have fastening holes 53 and 73, respectively, so as to be inserted onto the second axle segment 32.

Further, a gasket 8 is disposed between the nut 6 and the elastic part 7. The first axle segment 31 of the pivotal axle 3 is formed to have oil grooves 311. The other side of the enclosing part 1 is disposed with a stopping portion 17 and the first axle segment 31 of the pivotal axle 3 is disposed with a positioning portion 37. When the pivotal axle 3 is being rotated, the positioning portion 37 of the pivotal axle 3 may be abutted against the stopping portion 17 so as to limit the rotation angle of the pivotal axle 3. The extending end 18 of the enclosing part 1 is formed to have a positioning hole 19 and the pivotal axle 3 may be connected with a fixed seat 9.

Figure 5:
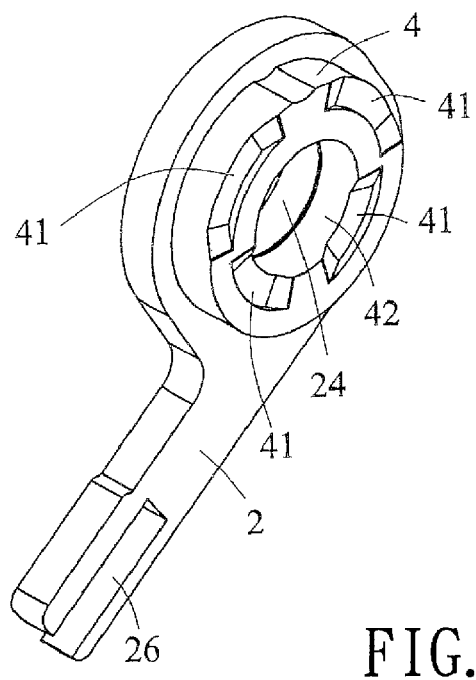
FIGS. 5 to 7 are perspective assembly views of partial elements of the present invention.
Figure 6:
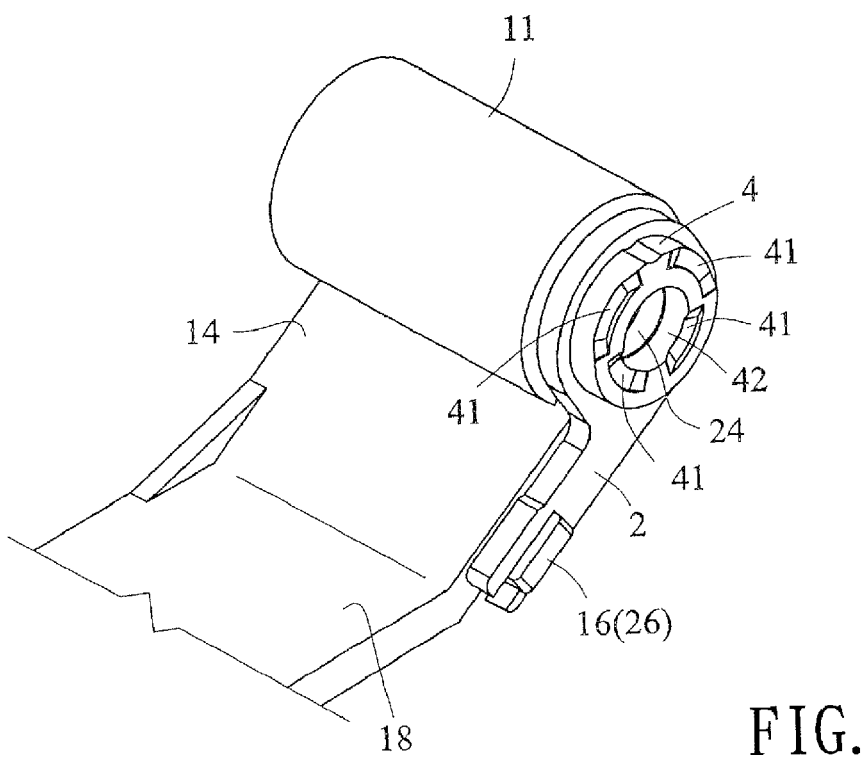
Figure 7:
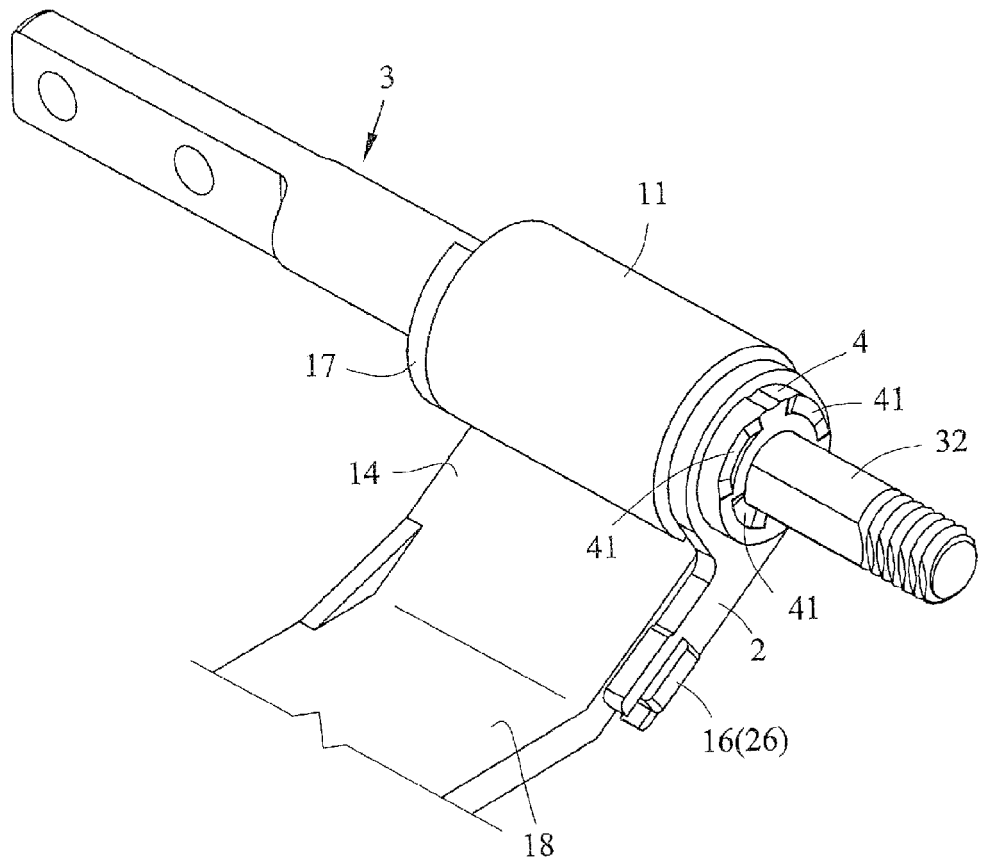

With reference to FIGS. 5 to 7, a preferred embodiment of the assembly of the hinge device according to the present invention is described as follows: the two protruded blocks 45 of the locking retainer 4 are embeddingly secured onto the two notch grooves 25 of the arresting part 2. With the two positioning points formed by the two protruded blocks 45 and the two notch grooves 25, the through hole 42 may be aligned with the pivotal hole 24, and after their joining together, the arresting part 2 is securingly fixed on one side of the enclosing part 1. Since the locking retainer 4 and the arresting part 2 has no sliding therebetween, further alignment between the through hole 42 and the pivotal hole 24 is unnecessary. Consequently, the pivotal axle 3 may directly be inserted into the enclosing part 1, the arresting part 2, and the locking retainer 4 in one go, leading to a simple assembly. In other words, after the first axle segment 31 is pivoted onto the enclosing end 11, the second axle segment 32 may be inserted into the pivotal hole 24 and the through hole 42 at the same time, thereby achieving an easy alignment of the axle holes.

Figure 8:
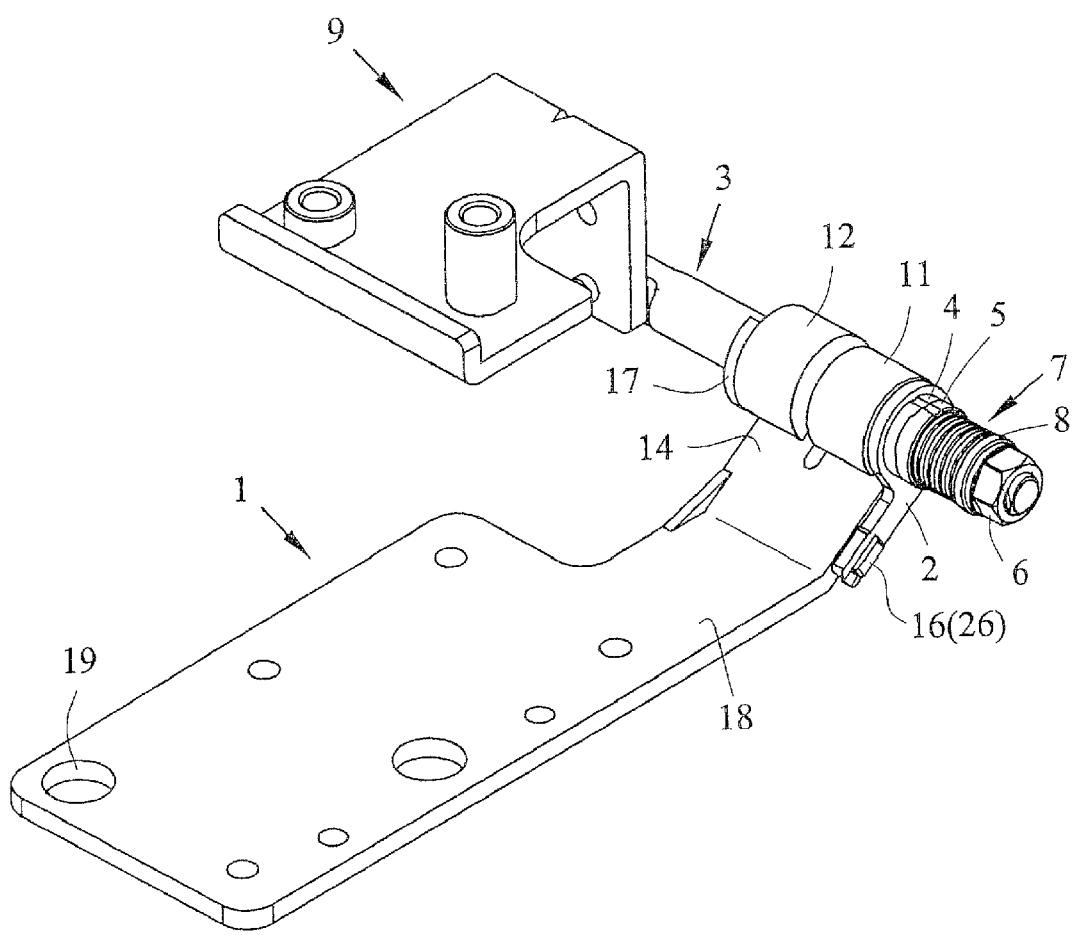
FIG. 8 is the perspective view of the second embodiment of the present invention.

With reference to FIG. 8, in the second embodiment of the present invention, the enclosing part 1 according to the present invention may be further re-designed such that the enclosing part 1 has a first enclosing end 11 and a second enclosing end 12, the directions of whose openings 15 are the same, pointing to the inner face 14, wherein the interferences of the external diameter of the pivotal axle 3 pivoted with the holes of the first and second enclosing ends 11, 12 are different, such that the frictional torsions generated between the pivotal axle 3 with the first and second enclosing ends 11, 12 are different. Therefore, the torsion can be adjusted accordingly, which is also an embodiment of the present invention.

For example, if the frictional torsions generated between the pivotal axle 3 pivoted with the first enclosing end 11 and the second enclosing end 12 are 5 kg/cm and 4 kg/cm, respectively, when the pivotal axle 3 rotates toward the inner face 14, the accumulated frictional torsion is 9 kg/cm; when the pivotal axle 3 rotates toward the external side, if the frictional torsion generated between the pivotal axle 3 pivoted with the first enclosing end 11 is 3 kg/cm due to the effect of the opening 15 and that with the second enclosing end 12 is 2 kg/cm, the accumulated frictional torsion is 5 kg/cm. Consequently, the difference of the total frictional torsion generated at the first enclosing end 11 and the second enclosing end 12 when the pivotal axle 3 rotates clockwise and counter clockwise may reach about 4 kg/cm (9 kg/cm−5 kg/cm=4 kg/cm). However, before the addition is made, the difference of the frictional torsion generated at the first enclosing end 11 when the pivotal axle 3 rotates clockwise and counter clockwise is about 2 kg/cm (5 kg/cm−3 kg/cm=2 kg/cm) and the difference of the frictional torsion generated at the second enclosing end 12 when the pivotal axle 3 rotates clockwise and counter clockwise is about 2 kg/cm (4 kg/cm−2 kg/cm=2 kg/cm). The preferred embodiment of the present invention, however, may effectively adjust the difference of the frictional torsion, reaching as high as 4 kg/cm (9 kg/cm 5 kg/cm=4 kg/cm), which is an advantage of accumulating frictional torsion.

Figure 9:
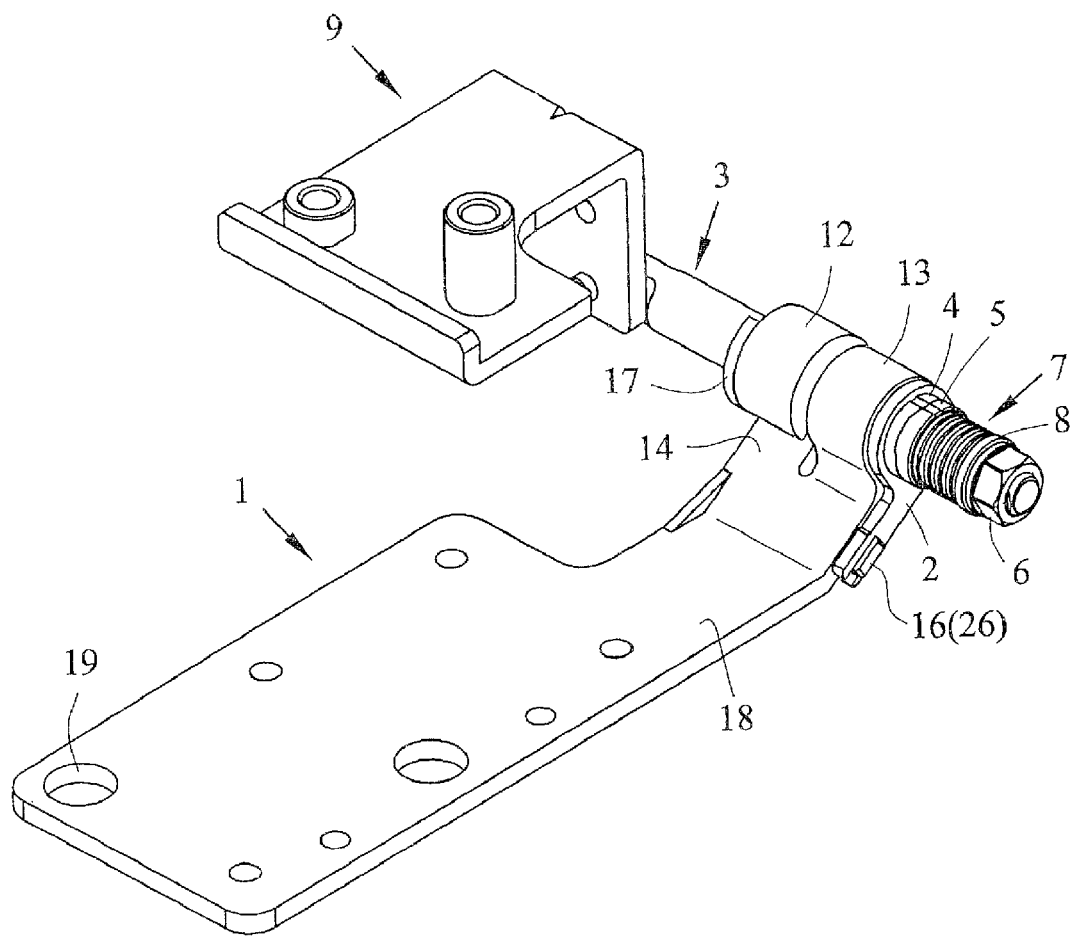
FIG. 9 is the perspective view of the third embodiment of the present invention.
Figure 10:
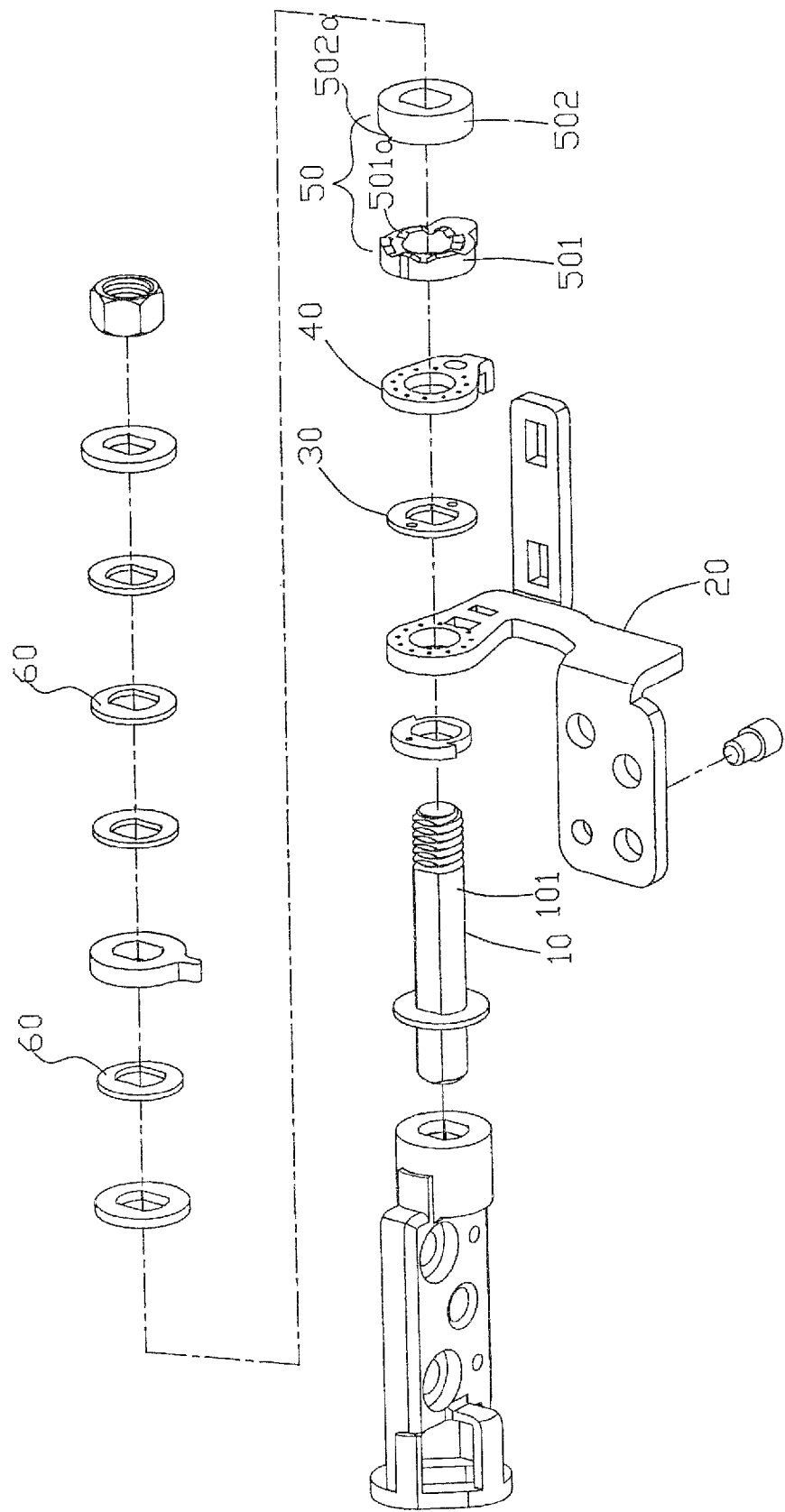
FIG. 10 is an exploded perspective view of a prior art.

With reference to FIG. 9, in the third embodiment of the present invention, the enclosing part 1 according to the present invention may be further re-designed such that the enclosing part 1 has a first enclosing end 13 and a second enclosing end 12, the directions of whose openings 15 are opposite to each other, wherein the interferences of the external diameter of the pivotal axle 3 pivoted with the holes of the first and second enclosing ends 13, 12 are different, such that the frictional torsions generated between the pivotal axle 3 with the first and second enclosing ends 13, 12 are different. Therefore, the torsion can be adjusted accordingly, which is also an embodiment of the present invention.

For example, when the pivotal axle 3 rotates toward the inner face 14, if the frictional torsion generated between the pivotal axle 3 pivoted with the first enclosing end 13 is 3 kg/cm due to the effect of the opening 15 and that with the second enclosing end 12 is 6 kg/cm, the accumulated frictional torsion is 9 kg/cm; when the pivotal axle 3 rotates toward the external side, if the frictional torsion generated between the pivotal axle 3 pivoted with the first enclosing end 13 is 5 kg/cm due to the effect of the opening 15 and that with the second enclosing end 12 is 2 kg/cm, the accumulated frictional torsion is 7 kg/cm. Consequently, the "positive difference" of the total frictional torsion may reach about 2 kg/cm (9 kg/cm−7 kg/cm=2 kg/cm) even if the first enclosing end 13 and the second enclosing end 12 have opposite openings 15.

While the invention has been described with reference to the a preferred embodiment thereof, it is to be understood that modifications or variations may be easily made without departing from the spirit of this invention, which is defined by the appended claims.

What is claimed is:

1. An enclosed hinge device with a readily center-aligned mechanism, comprising:

an enclosing part having an enclosing end extending along a width of a end thereof and a fastening block spaced apart from the enclosing end and extending outwardly from an outer edge thereof;

an arresting part having a pair of notch grooves and a pivot hole located on a first end thereof and a fastening notch groove located on a second end thereof opposite the first end, the arresting part is securingly fixed directly to the outer edge of the enclosing part, the pair of notch grooves are spaced apart from an outer periphery and the pivotal hole of the arresting part, the fastening block of the enclosing part is inserted into the fastening notch groove of the arresting part;

a locking retainer having a pair of protruded blocks and a through hole, one of the pair of protruded blocks is inserted into and fastened with each of the pair of notch grooves; and a pivotal axle having a first axle segment pivotally inserted into the enclosing end, and a second axle segment pivotally inserted through the pivotal hole of the arresting part and inserted through the through hole of the locking retainer;

wherein the end of the second axle segment is inserted, in the order of, a locking rotator, and elastic parts, and is then securingly retained with a nut with the locking rotator being rotatable with the second axle segment, wherein the pair of protruded blocks and the pair of notch grooves of the arresting part fixing and aligning the locking retainer relative to the arresting part and providing proper alignment and rotation of the pivotal axle;

wherein the arresting part increasing a rigidity of the enclosing part and reducing a shaking of the pivotal axle.

2. The enclosed hinge device with a readily center-aligned mechanism as defined in claim 1, wherein the locking retainer has a positioning slot and the locking rotator has a positioning block, and when the locking rotator is in the locking position, the positioning block is positioned at the positioning slot.

3. The enclosed hinge device with a readily center-aligned mechanism as defined in claim 1, wherein the elastic part is a plurality of spring discs of springs, and the plurality of the spring discs are formed to have arc faces and alternately inserted onto the end of the second axle segment; the second axle segment of the pivotal axle is formed to have at least a flat face, and the locking rotator and the plurality of the spring discs are correspondingly disposed with fastening holes, respectively, so as to be inserted onto the second axle segment.

4. The enclosed hinge device with a readily center-aligned mechanism as defined in claim 1, wherein a gasket is disposed between the nut and the elastic part, and the first axle segment of the pivotal axle is formed to have oil grooves.

5. The enclosed hinge device with a readily center-aligned mechanism as defined in claim 1, wherein the other side of the enclosing part is disposed with a stopping portion and the first axle segment of the pivotal axle is disposed with a positioning portion, and when the pivotal axle is being rotated, the positioning portion of the pivotal axle is abutted against the stopping portion so as to limit the rotation angle of the pivotal axle.

6. The enclosed hinge device with a readily center-aligned mechanism as defined in claim 1, wherein an extending end of the enclosing part is formed to have a positioning hole and the pivotal axle is connected with a fixed seat.

7. An enclosed hinge device with a readily center-aligned mechanism, comprising:
an enclosing part having a first enclosing end and a second enclosing end extending along a width of a end thereof and a fastening block spaced apart from the first enclosing end and the second enclosing end and extending outwardly from an outer edge thereof, the directions of openings of the first enclosing end and the second enclosing end are the same;
an arresting part having a pair of notch grooves and a pivot hole located on a first end thereof and a fastening notch groove located on a second end thereof opposite the first end, the arresting part is securingly fixed directly to the outer edge of the enclosing part, the pair of notch grooves are spaced apart from an outer periphery and the pivotal hole of the arresting part, the fastening block of the enclosing part is inserted into the fastening notch groove of the arresting part;
a locking retainer having a pair of protruded blocks and a through hole, one of the pair of protruded blocks is inserted into and fastened with each of the pair of notch grooves; and
a pivotal axle having a first axle segment pivotally inserted into the first and second enclosing ends to have two different frictional torsions, respectively, and a second axle segment pivotally inserted through the pivot hole of the arresting part and inserted through the through hole of the locking retainer;
wherein the end of the second axle segment is inserted, in the order of, a locking rotator, and elastic parts, and is then securingly retained with a nut with the locking rotator being rotatable with the second axle segment, wherein the pair of protruded blocks and the pair of notch grooves of the arresting part fixing and aligning the locking retainer relative to the arresting part and providing proper alignment and rotation of the pivotal axle;

wherein the arresting part increasing a rigidity of the enclosing part and reducing a shaking of the pivotal axle.

8. The enclosed hinge device with a readily center-aligned mechanism as defined in claim 7, wherein the locking retainer has a positioning slot and the locking rotator has a positioning block, and when the locking rotator is in the locking position, the positioning block is positioned at the positioning slot.

9. The enclosed hinge device with a readily center-aligned mechanism as defined in claim 7, wherein the elastic part is a plurality of spring discs of springs, and the plurality of the spring discs are formed to have arc faces and alternately inserted onto the end of the second axle segment; the second axle segment of the pivotal axle is formed to have at least a flat face, and the locking rotator and the plurality of the spring discs are correspondingly disposed with fastening holes, respectively, so as to be inserted onto the second axle segment.

10. The enclosed hinge device with a readily center-aligned mechanism as defined in claim 7, wherein a gasket is disposed between the nut and the elastic part, and the first axle segment of the pivotal axle is formed to have oil grooves.

11. The enclosed hinge device with a readily center-aligned mechanism as defined in claim 7, wherein the other side of the enclosing part is disposed with a stopping portion and the first axle segment of the pivotal axle is disposed with a positioning portion, and when the pivotal axle is being rotated, the positioning portion of the pivotal axle is abutted against the stopping portion so as to limit the rotation angle of the pivotal axle.

12. The enclosed hinge device with a readily center-aligned mechanism as defined in claim 7, wherein the extending end of the enclosing part is formed to have a positioning hole and the pivotal axle is connected with a fixed seat.

13. An enclosed hinge device with a readily center-aligned mechanism, comprising:
an enclosing part having a first enclosing end and a second enclosing end extending along a width of the end thereof and a fastening block spaced apart from the first enclosing end and the second enclosing end and extending outwardly from an outer edge thereof, the directions of openings of the first enclosing end and the second enclosing end are opposite to each other;
an arresting part having a pair of notch grooves and a pivot hole located on a first end thereof and a fastening notch groove located on a second end thereof opposite the first end, the arresting part is securingly fixed directly to the outer edge of the enclosing part, the pair of notch grooves are spaced apart from an outer periphery and the pivotal hole of the arresting part, the fastening block of the enclosing part is inserted into the fastening notch groove of the arresting part;
a locking retainer having a pair of protruded blocks and a through hole, one of the pair of protruded blocks is inserted into and fastened with each of the pair of notch grooves; and
a pivotal axle having a first axle segment pivotally inserted into the first and second enclosing ends to have two different frictional torsions, respectively, and a second axle segment pivotally inserted through the pivot hole of the arresting part and inserted through the through hole of the locking retainer;
wherein the end of the second axle segment is inserted, in the order of, a locking rotator, and elastic parts, and is then securingly retained with a nut with the locking rotator being rotatable with the second axle segment, wherein the pair of protruded blocks and the pair of notch grooves of the arresting part fixing and aligning the locking retainer relative to the arresting part and providing proper alignment and rotation of the pivotal axle;

wherein the arresting part increasing a rigidity of the enclosing part and reducing a shaking of the pivotal axle.

14. The enclosed hinge device with a readily center-aligned mechanism as defined in claim 13, wherein the locking retainer has a positioning slot and the locking rotator has a positioning block, and when the locking rotator is in the locking position, the positioning block is positioned at the positioning slot.

15. The enclosed hinge device with a readily center-aligned mechanism as defined in claim 13, wherein the elastic part is a plurality of spring discs of springs, and the plurality of the spring discs are formed to have arc faces and alternately inserted onto the end of the second axle segment; the second axle segment of the pivotal axle is formed to have at least a flat face, and the locking rotator and the plurality of the spring discs are correspondingly disposed with fastening holes, respectively, so as to be inserted onto the second axle segment.

16. The enclosed hinge device with a readily center-aligned mechanism as defined in claim 13, wherein a gasket is disposed between the nut and the elastic part, and the first axle segment of the pivotal axle is formed to have oil grooves.

17. The enclosed hinge device with a readily center-aligned mechanism as defined in claim 13, wherein the other side of the enclosing part is disposed with a stopping portion and the first axle segment of the pivotal axle is disposed with a positioning portion, and when the pivotal axle is being rotated, the positioning portion of the pivotal axle is abutted against the stopping portion so as to limit the rotation angle of the pivotal axle.

18. The enclosed hinge device with a readily center-aligned mechanism as defined in claim 13, wherein the extending end of the enclosing part is formed to have a positioning hole and the pivotal axle is connected with a fixed seat.

* * * * *